US011595816B2

United States Patent
Ibrahim et al.

(10) Patent No.: US 11,595,816 B2
(45) Date of Patent: Feb. 28, 2023

(54) SYSTEM AND METHOD TO SUPPORT IDENTITY THEFT PROTECTION AS PART OF A DISTRIBUTED SERVICE ORIENTED ECOSYSTEM

(71) Applicant: Workday, Inc., Pleasanton, MI (US)

(72) Inventors: Mamdouh Ibrahim, Rochester Hills, MI (US); Sri Ramanathan, Lutz, FL (US); Tapas K. Som, Germantown, MD (US); Matthew B. Trevathan, Roswell, GA (US)

(73) Assignee: Workday, Inc., Pleasanton, CA (US)

( * ) Notice: Subject to any disclaimer, the term of this patent is extended or adjusted under 35 U.S.C. 154(b) by 803 days.

(21) Appl. No.: 15/138,315

(22) Filed: Apr. 26, 2016

(65) Prior Publication Data

US 2016/0239845 A1 Aug. 18, 2016

Related U.S. Application Data

(63) Continuation of application No. 12/367,619, filed on Feb. 9, 2009, now Pat. No. 9,357,384.

(51) Int. Cl.
*H04W 12/06* (2021.01)
*G06Q 30/00* (2012.01)
(Continued)

(52) U.S. Cl.
CPC ........ *H04W 12/06* (2013.01); *G06Q 20/4014* (2013.01); *G06Q 30/00* (2013.01);
(Continued)

(58) Field of Classification Search
CPC ............... G06Q 20/4014; G06Q 30/32; G06Q 50/265; H04L 63/1433; H04L 65/1006; H04L 65/1016; H04W 4/12; H04W 12/06
See application file for complete search history.

(56) References Cited

U.S. PATENT DOCUMENTS

| 6,175,922 B1 * | 1/2001 | Wang ............... G07F 7/0866 713/182 |
| 6,327,578 B1 * | 12/2001 | Linehan ............ G06Q 20/02 705/65 |
| 6,892,307 B1 | 5/2005 | Wood et al. |
| 6,950,407 B1 * | 9/2005 | Huddle ............... H04L 12/14 370/254 |
| 7,076,657 B2 | 7/2006 | Koukoulidis et al. |
| (Continued) |

FOREIGN PATENT DOCUMENTS

WO 2007023286 A1 3/2007

OTHER PUBLICATIONS

Lawrence O'Gorman; "Comparing Passwords, Tokens, and Biometrics for User Authentication"; 2003; file 'Comparing_Passwords_Tokens_and_Biometrics_for_User_Authentication.pdf' (Year: 2003).*
(Continued)

*Primary Examiner* — John W Hayes
*Assistant Examiner* — Edgar R. Martinez-Hernandez
(74) *Attorney, Agent, or Firm* — Van Pelt, Yi & James LLP

(57) ABSTRACT

A system and method to support identity theft protection and, in particular, to a system and method for supporting identity theft protection as part of a distributed service oriented ecosystem in Internet protocol (IP) multimedia subsystem (IMS) and non-IMS networks. The system includes an identity session initiation protocol (SIP) application server configured to act as a security assertion markup language (SAML) bridge, which allows an SIP enabled device or a non-SIP enabled device to attach to a telecommunications service provider network. A user may accept or reject an authorization request using the SIP enabled device or non-SIP enabled device.

24 Claims, 5 Drawing Sheets

(51) Int. Cl.
*H04L 65/1104* (2022.01)
*G06Q 20/40* (2012.01)
*G06Q 50/26* (2012.01)
*H04L 9/40* (2022.01)
*H04L 65/1016* (2022.01)
*H04W 4/12* (2009.01)

(52) U.S. Cl.
CPC ....... *G06Q 50/265* (2013.01); *H04L 63/1433* (2013.01); *H04L 65/1016* (2013.01); *H04L 65/1104* (2022.05); *H04W 4/12* (2013.01)

(56) References Cited

U.S. PATENT DOCUMENTS

| | | | |
|---|---|---|---|
| 7,237,256 B2 | 6/2007 | Cheng et al. | |
| 7,254,560 B2 | 8/2007 | Singhal | |
| 7,290,278 B2 | 10/2007 | Cahill et al. | |
| 7,310,532 B2 | 12/2007 | Knauerhase et al. | |
| 7,343,486 B1 | 3/2008 | McCarty et al. | |
| 7,350,230 B2* | 3/2008 | Forrest | G06Q 20/32 705/67 |
| 7,496,183 B1* | 2/2009 | Rodkey | H04L 12/1895 455/412.2 |
| 7,591,413 B1* | 9/2009 | Block | G07F 19/20 235/379 |
| 7,751,567 B2 | 7/2010 | Quick, Jr. et al. | |
| 7,886,346 B2* | 2/2011 | Sandhu | G06F 21/31 709/229 |
| 8,027,353 B2* | 9/2011 | Damola | H04L 29/06217 370/401 |
| 8,046,823 B1* | 10/2011 | Begen | G06F 21/335 726/12 |
| 8,191,082 B2* | 5/2012 | Ramanathan | H04L 67/5681 709/219 |
| 8,270,417 B2 | 9/2012 | Kolhi et al. | |
| 8,312,540 B1* | 11/2012 | Kahn | H04L 63/1425 726/22 |
| 8,365,258 B2* | 1/2013 | Dispensa | H04L 63/0869 705/64 |
| 8,401,968 B1* | 3/2013 | Schattauer | G06Q 30/06 705/37 |
| 8,438,382 B2* | 5/2013 | Ferg | H04L 9/321 713/155 |
| 8,583,915 B1* | 11/2013 | Huang | H04L 9/3236 713/155 |
| 8,712,453 B2* | 4/2014 | Geil | H04L 51/38 455/411 |
| 8,880,435 B1* | 11/2014 | Catlett | G06Q 20/10 705/75 |
| 9,037,685 B2* | 5/2015 | Welingkar | H04L 67/62 709/219 |
| 9,357,384 B2* | 5/2016 | Ibrahim | G06Q 30/00 |
| 9,531,817 B2* | 12/2016 | Levenshteyn | H04L 65/104 |
| 2003/0073426 A1 | 4/2003 | Chan et al. | |
| 2003/0091042 A1 | 5/2003 | Lor | |
| 2003/0097484 A1 | 5/2003 | Bahl | |
| 2003/0101134 A1* | 5/2003 | Liu | G06Q 20/12 705/39 |
| 2003/0135731 A1* | 7/2003 | Barkan | H04L 9/3263 713/155 |
| 2003/0172090 A1 | 9/2003 | Asunmaa et al. | |
| 2003/0233278 A1* | 12/2003 | Marshall | G06Q 30/0212 705/14.35 |
| 2004/0121775 A1 | 6/2004 | Ropolyi et al. | |
| 2004/0123158 A1* | 6/2004 | Roskind | H04L 63/083 726/6 |
| 2004/0165729 A1 | 8/2004 | Bisson et al. | |
| 2004/0182921 A1* | 9/2004 | Dickson | G07F 7/1025 235/380 |
| 2004/0213150 A1 | 10/2004 | Krause et al. | |
| 2004/0254868 A1 | 12/2004 | Kirkland et al. | |
| 2005/0044404 A1 | 2/2005 | Bhansali et al. | |
| 2005/0256732 A1 | 11/2005 | Bauer et al. | |
| 2005/0259675 A1 | 11/2005 | Tuohino et al. | |
| 2005/0273442 A1* | 12/2005 | Bennett | H04L 9/3215 705/67 |
| 2005/0276268 A1 | 12/2005 | Poikselka et al. | |
| 2006/0017970 A1* | 1/2006 | Park | H04N 1/00278 358/1.15 |
| 2006/0050705 A1 | 3/2006 | Kim | |
| 2006/0131385 A1* | 6/2006 | Kim | G06Q 20/40 235/379 |
| 2006/0153102 A1 | 7/2006 | Kuure et al. | |
| 2006/0179304 A1* | 8/2006 | Han | G06Q 30/04 713/168 |
| 2006/0242310 A1 | 10/2006 | Quah et al. | |
| 2007/0010275 A1 | 1/2007 | Kiss | |
| 2007/0061397 A1 | 3/2007 | Gregorat et al. | |
| 2007/0156909 A1* | 7/2007 | Osborn | H04L 65/1006 709/227 |
| 2007/0189220 A1 | 8/2007 | Dberle et al. | |
| 2007/0209059 A1 | 9/2007 | Moore et al. | |
| 2007/0255662 A1* | 11/2007 | Tumminaro | G06Q 20/10 705/79 |
| 2007/0270123 A1 | 11/2007 | Cai et al. | |
| 2007/0282911 A1 | 12/2007 | Bantukul et al. | |
| 2007/0288621 A1* | 12/2007 | Gundu | H04L 65/1006 709/223 |
| 2008/0037522 A1 | 2/2008 | Rasanen | |
| 2008/0046368 A1* | 2/2008 | Tidwell | G06Q 20/40 705/44 |
| 2008/0049648 A1 | 2/2008 | Liu et al. | |
| 2008/0066165 A1 | 3/2008 | Rosenoer | |
| 2008/0080480 A1* | 4/2008 | Buckley | H04L 12/66 370/352 |
| 2008/0086564 A1 | 4/2008 | Putman et al. | |
| 2008/0098464 A1* | 4/2008 | Mizrah | G06F 21/36 726/5 |
| 2008/0109365 A1 | 5/2008 | Kulkarni et al. | |
| 2008/0114690 A1 | 5/2008 | Skidmore et al. | |
| 2008/0120711 A1* | 5/2008 | Dispensa | H04L 63/08 726/7 |
| 2008/0133761 A1 | 6/2008 | Polk | |
| 2008/0148358 A1 | 6/2008 | Denny et al. | |
| 2008/0163318 A1 | 7/2008 | Chen et al. | |
| 2008/0189760 A1 | 8/2008 | Rosenberg et al. | |
| 2008/0274735 A1* | 11/2008 | Choksi | H04L 67/16 455/432.2 |
| 2008/0283593 A1* | 11/2008 | He | G06Q 40/02 235/380 |
| 2008/0311888 A1 | 12/2008 | Ku et al. | |
| 2008/0316998 A1 | 12/2008 | Procopio et al. | |
| 2008/0319889 A1* | 12/2008 | Hammad | G06Q 40/02 705/35 |
| 2009/0017796 A1* | 1/2009 | Foti | H04L 29/12584 455/414.1 |
| 2009/0076952 A1 | 3/2009 | Cadenas et al. | |
| 2009/0080404 A1 | 3/2009 | Laurila et al. | |
| 2009/0089869 A1* | 4/2009 | Varghese | G06Q 20/4014 726/7 |
| 2009/0094666 A1 | 4/2009 | Cao et al. | |
| 2009/0220091 A1 | 9/2009 | Howard | |
| 2009/0228707 A1* | 9/2009 | Linsky | H04L 63/1466 713/171 |
| 2009/0304009 A1 | 12/2009 | Kolhi et al. | |
| 2009/0307141 A1 | 12/2009 | Kongalath et al. | |
| 2010/0037046 A1* | 2/2010 | Ferg | H04L 9/321 713/155 |
| 2010/0095199 A1 | 4/2010 | Oh et al. | |
| 2010/0099387 A1 | 4/2010 | So et al. | |
| 2010/0167762 A1 | 7/2010 | Pandey | |
| 2010/0175136 A1* | 7/2010 | Frumer | G06F 21/31 726/26 |
| 2010/0311392 A1 | 12/2010 | Stenfelt et al. | |
| 2011/0004942 A1 | 1/2011 | Boberg et al. | |
| 2011/0010312 A1 | 1/2011 | McDonald | |
| 2011/0099169 A1 | 4/2011 | Lanxner et al. | |
| 2011/0103265 A1 | 5/2011 | Dilipkumar Saklikar et al. | |
| 2011/0213711 A1* | 9/2011 | Skinner | G06F 21/43 705/71 |

(56) References Cited

U.S. PATENT DOCUMENTS

| | | | |
|---|---|---|---|
| 2011/0231901 A1* | 9/2011 | Nakamura | G06F 13/385 |
| | | | 726/3 |
| 2011/0255531 A1 | 10/2011 | Noldus | |
| 2011/0302641 A1* | 12/2011 | Hald | G06F 21/35 |
| | | | 726/7 |
| 2012/0039452 A1 | 2/2012 | Horn et al. | |
| 2012/0192256 A1* | 7/2012 | Peterson | H04L 63/0807 |
| | | | 726/7 |
| 2013/0124422 A1* | 5/2013 | Hubert | G06Q 20/3827 |
| | | | 705/71 |

OTHER PUBLICATIONS

Ivan Vidal, Ignacio Soto, Francisco Valera, Jaime Garcia, Arturo Azcorra; "IMS signalling for multiparty services based on network level multicast"; 2007; file 'IMS_signalling_for_multiparty_services.pdf' (Year: 2007).*

Christophe Gourraud; "Using IMS as a Service Framework"; 2007; file 'Using_IMS_as_a_Service_Framework.pdf' (Year: 2007).*

Notice of Allowance dated Jan. 23, 2018 in related U.S. Appl. No. 13/481,082, 4 pages.

Rosenburg et al., "SIP: Session Initiation Protocol", Jun. 2002, all pages, http://www.cs.columbia.edu/sip/drafts/rfc3261.pdf.

3GPP, "IMS" retreived Jun. 13, 2011.

BearBytes vol. 2 Issue 2, Mar./Apr. 2006, pp. 3-5.

3GPP, "3GPP TS 33.203 v5.11.0", Sep. 2006, all pages.

Jose Costa-Requena et al., "Annlication of Spatial Location Information to SIP", vol. 5, No. 4, Oct. 2002.

Final Office Action in related U.S. Appl. No. 13/481,069 dated Feb. 14, 2017, 19 pages.

Office Action in related U.S. Appl. No. 13/481,069 dated Aug. 18, 2016, pp. 35.

Ron White, How Computers Work, Oct. 15, 2003, Que Publishing, 7th Ed. (Year: 2003), 23 pp.

Office Action in related U.S. Appl. No. 13/481,069 dated Aug. 15, 2018, 23 pages.

Final Office Action dated Aug. 20, 2014 in related U.S. Appl. No. 13/481,082, 17 pages.

Final Office Action dated Aug. 4, 2014 in related U.S. Appl. No. 13/481,069, 18 pages.

Final Office Action dated Dec. 21, 2015 in related U.S. Appl. No. 12/367,619, 14 pages.

Notice of Allowance dated Mar. 4, 2016 in related U.S. Appl. No. 12/367,619, 10 pages.

Office Action dated Dec. 7, 2012 for U.S. Appl. No. 13/481,082; 14 pages.

Office Action dated Sep. 2, 2015 in related U.S. Appl. No. 12/367,619 17 pages.

Office Action for related U.S. Appl. No. 13/481,069 dated Mar. 12, 2013, 12 pages.

* cited by examiner

SYSTEM AND METHOD TO SUPPORT IDENTITY THEFT PROTECTION AS PART OF A DISTRIBUTED SERVICE ORIENTED ECOSYSTEM

CROSS REFERENCE TO OTHER APPLICATIONS

This application is a continuation of U.S. patent application Ser. No. 12/367,619, now U.S. Pat. No. 9,357,384, entitled SYSTEM AND METHOD TO SUPPORT IDENTITY THEFT PROTECTION AS PART OF A DISTRIBUTED SERVICE ORIENTED ECOSYSTEM filed Feb. 9, 2009 which is incorporated herein by reference for all purposes.

FIELD OF THE INVENTION

The invention generally relates to a system and method to support identity theft protection and, in particular, to a system and method for supporting identity theft protection as part of a distributed service oriented ecosystem in Internet protocol (IP) multimedia subsystem (IMS) and non-IMS networks.

BACKGROUND

In today's connected society, service providers are facing several threats to their core business models. For example, service providers are faced with the realization that voice services are becoming commoditized by free voice calling over the Internet and data services are making service providers little more than a bitpipe. This realization has led service providers to think of new types of revenue generating services that may be necessitated in a Web 2.0 Internet centric world.

One area in which service providers are focusing their attention is on the problem of identity theft. A major cause of the identity theft problem arises from people posing as someone else and hijacking the person's identity. This costs the United States economy as well as the global economy billions of dollars in losses every year. This problem is particularly exacerbating because most people manage all of their financial and personal information online. Thus, merely stealing one's credentials, such as a user identification and password, can provide a thief with the resources required to assume a person's identity with minimal trouble.

When one's credential set is stolen and used maliciously online, it is often too late before the actual owner of the credential even realizes that damage has been done, especially when thieves mimic the owner's usage patterns so as to not set off alarms in the service providers' security systems. This mimicking process allows thieves to periodically siphon off small quantities of funds, e.g., from banks, and leads to pervasive identity theft that threatens to damage the trust based underpinnings of the Internet.

A number of reasons have contributed to the online identity theft problem. For example, several malware operators actively distribute keystroke loggers and harvesters to multiple target personal computers and other clients. These keystroke loggers and harvesters are capable of collecting credential information, which can be transmitted back to remote locations outside of the United States and to other areas where regulatory and law enforcement is practically nonexistent.

A number of malware operators exist and can be encapsulated in, e.g., emails functioning as a Trojan horse. These emails allow for the quiet takeover of a host machine without the consumer even knowing that the his or her information is being taken. Malware is particularly harmful to consumers because millions of devices are not protected by any security software, do not include updates for existing software, and/or do not support security software, such as personal digital assistants, mobile devices, etc.

Accordingly, there exists a need in the art to overcome the deficiencies and limitations described hereinabove.

SUMMARY

In a first aspect of the invention, a system comprises an identity session initiation protocol (SIP) application server configured to act as a security assertion markup language (SAML) bridge, which allows an SIP enabled device or a non SIP enabled device to attach to a telecommunications service provider network. The system allows a user to accept or reject an authorization request using the SIP enabled device or non-SIP enabled device.

In another aspect of the invention, a computer implemented method comprising a computer usable storage medium for supporting identity theft protection comprises receiving one or more credentials via a login attempt on a first device. The computer implemented method also comprises processing the one or more credentials to identify a subscriber having the one or more credentials and sending a message to the subscriber on a second device to notify the subscriber of the login attempt on the first device.

In yet another aspect of the invention, a computer program product comprising a computer usable medium having readable program code embodied in the medium is provided. The computer program product includes at least one component operable to: process an authentication request comprising one or more credentials; process the one or more credentials to identify a subscriber; determine whether the subscriber has an Internet protocol (IP) multimedia subsystem (IMS) device; and send a message to the subscriber to notify the subscriber of the authentication request.

In a further aspect of the invention, a method for supporting identity theft protection, comprises providing a computer infrastructure being operable to: receive one or more credentials via a login attempt on a first device; process the one or more credentials to identify a subscriber having the one or more credentials; and send a message to the subscriber on a second device to notify the subscriber of the login attempt on the first device.

BRIEF DESCRIPTION OF SEVERAL VIEWS OF THE DRAWINGS

The present invention is described in the detailed description which follows, in reference to the noted plurality of drawings by way of non-limiting examples of exemplary embodiments of the present invention.

DETAILED DESCRIPTION

Figure 1:
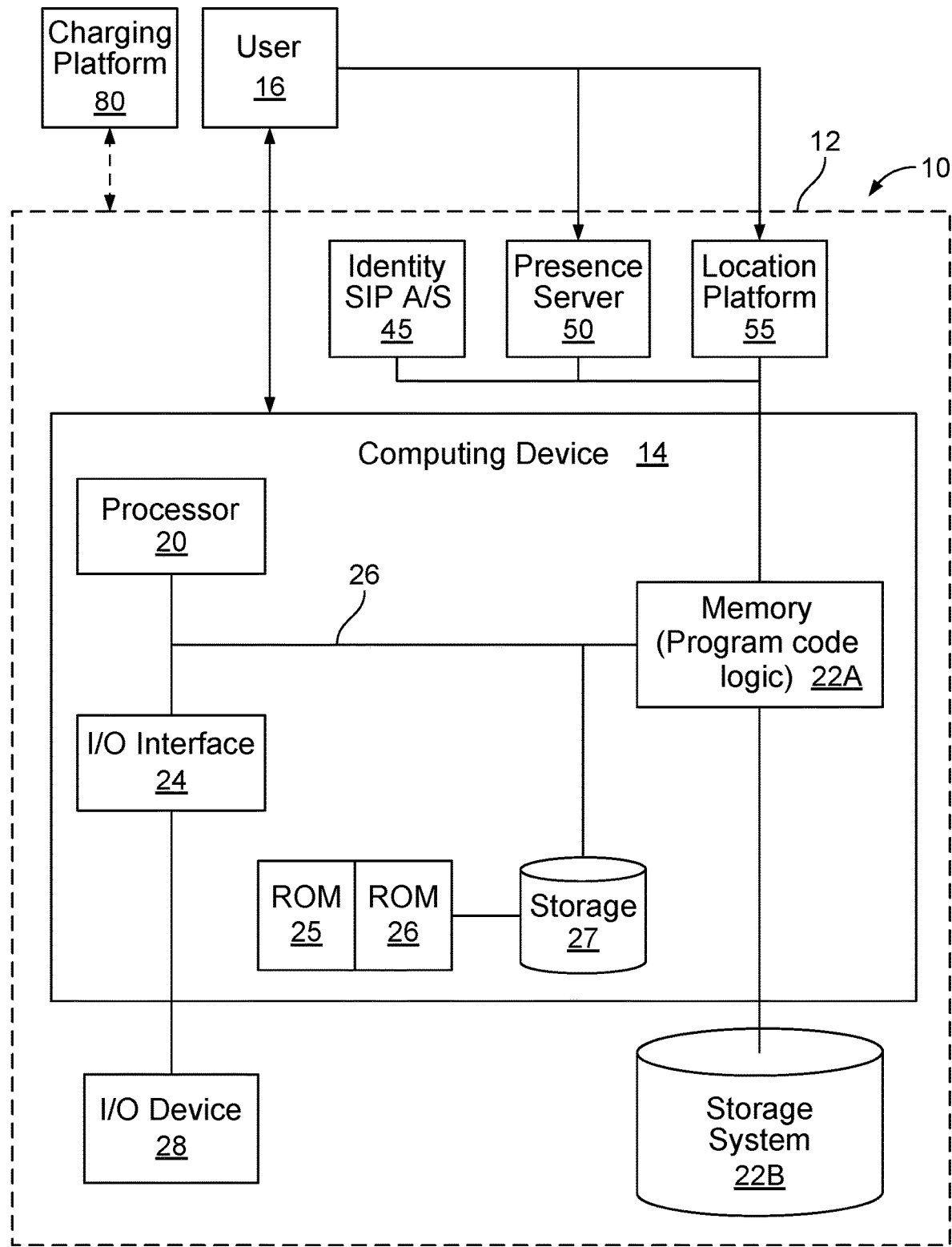
FIG. 1 shows an illustrative environment for implementing the steps in accordance with the invention.

The invention is directed to a system and method to support identity theft protection and, in particular, to a system and method for supporting identity theft protection as part of a distributed service oriented ecosystem in Internet protocol (IP) multimedia subsystem (IMS) and non-IMS networks. More specifically, the present invention includes a SAML bridge with either a SIP enabled device or a non SIP device attached to a telecommunications service provider network for the intent of participating in authentication flows in both an online and an offline manner.

Millions of people's online credentials are routinely compromised. One reason for the compromise is because many people do not have the technical savvy to adequately protect their computer, data, and other information assets. The process of managing credentials, e.g., people's identities, is a complex area. To ensure that people's identities are protected, service providers need to provide deployment patterns and solutions that support low latency implementation. Moreover, service providers need to work with wireless or wireline service providers to ensure people's online credentials do not become compromised.

The present invention uses an Internet protocol (IP) multimedia subsystem, which is a reference architecture for telecommunications networks that standardizes on an IP core while using SIP for signaling. This architecture standardizes sessions across multiple underlying media types. The IP multimedia subsystem includes a carrier service plane, which provides foundational services that composite services can leverage. This is beneficial for opening up revenue generating capabilities as web services continue to evolve in an Internet based service oriented architecture (SOA). Moreover, as applied in the present invention, the IP multimedia subsystem can be used to save billions of dollars in identity related online fraud.

The IP multimedia subsystem in the present invention may include an identity SIP application server (A/S). In embodiments, a SAML/SIP bridge device may be used as part of the identity SIP A/S and may be configured to leverage multiple network assets including, e.g., a presence server (RPID or PIDF), a location platform, a charging platform, and a XML document management system (XDMS) via both SIP and XCAP. These telecommunication networks may be IMS or non-IMS and are configured to house assets to protect subscribers against online identity theft.

A number of benefits can be obtained from using the present invention. For example, the present invention effectively safeguards subscriber's online credential information for a high value online system. The present invention also provides support for timeouts on the client end for certain authentication requests and provides support for blackout times during which all authentication requests are disallowed. Embodiments also provide greater security by using a master pin to authorize an authentication in case the subscriber's IMS or non-IMS device has been compromised.

The present invention also beneficially provides a low latency massively scalable architecture that provides near real time delivery to allow for a decent customer experience. Embodiments of the invention support non-IMS subscribers using a messaging gateway and routing framework and also provides support a for highly flexible billing using the trusted relationship between the carrier and the subscriber.

By using the features herein, the present invention allows SIP to be effectively used along with a XDMS to monitor and maintain state changes and other information. Moreover, efficient low latency delivery of information to subscribers can be performed by embodiments of the invention. For example, a carrier may be configured to have a delivery infrastructure that is efficient using SIP or non-SIP enabled devices, which may be used for half duplex verification as part of a low latency call flow. Moreover, a low latency implementation model may be used to block counterfeit or false authentication networks, thereby allowing one or more unique aspects of a telecommunications network to be leveraged based on IMS and/or non-IMS technology.

System Environment

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following:

- a portable computer diskette,
- a hard disk,
- a random access memory (RAM),
- a read-only memory (ROM),
- an erasable programmable read-only memory (EPROM or Flash memory),
- a portable compact disc read-only memory (CDROM), and/or
- an optical storage device.

The computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

In the context of this document, a computer-usable or computer-readable medium may be any medium that can contain, store, communicate, propagate, or transport the program for use by or in connection with the instruction execution system, apparatus, or device. The computer usable program code may be transmitted using any appropriate transmission media via a network.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network. This may include, for example, a local area network (LAN) or a wide area network (WAN), or the connection may be made to an external computer (for example, through the Internet using an Internet service provider).

FIG. 1 shows an illustrative environment 10 for managing the processes in accordance with the invention. To this extent, the environment 10 includes a computer infrastructure 12 that can perform the processes described herein. In particular, the computer infrastructure 12 includes a computing device 14 that comprises an identity SIP A/S (application server) 45, a presence server 50, and a location platform 55. In embodiments, the presence server 50 and the location platform 55 may be provided and resident on a separate computer infrastructure 12 of, e.g., a service provider.

The identity SIP A/S 45, using computer code which may be implemented in memory 22A, is configured to act as a SAML bridge that allows a SIP enabled device to attach to a telecommunications service provider network for the intent of participating in authentication flows in an online and offline manner. For example, the identity SIP A/S 45 can be used to notify a user 16 of login attempts to a user's account. Accordingly, the identity SIP A/S 45 provides the user 16 with the ability to determine whether there is an unauthorized login attempt and, if so, deny the login attempt and prevent unauthorized persons from gaining access to the user's credentials. The identity SIP A/S 45 is also configured to integrate location information into presence documents, which allows for location related changes to be transmitted to the user 16 via standard SIP based semantics. In embodiments, the identity SIP A/S 45 may also include services and/or a framework for hosting services.

The presence server 50 is configured to accept, store and distribute presence information. The presence server 50 is also configured to determine a user's presence (e.g., presence state), which constitutes the user's personal availability. In embodiments, the presence server 50 may be implemented as a single server or have an internal structure involving multiple servers and proxies. Additionally, there may be complex patterns of redirection and proxying while retaining logical connectivity to a single presence service. In embodiments, the presence server 50 can be used, in combination with the identity SIP A/S 45, to determine whether a user is an authorized user logging in, for example, from a registered device.

The location platform 55, such as implemented on a network carrier, is configured to send location based information to the computing device 14. For example, the location platform 55 can receive a request from the computing device 14 and send location based information of the user 16 to the computing device 14. Although in embodiments the present invention can use global positioning, e.g., A-GPS or GPS, to provide true granularity to determine a user's exact position, a more generalized location can be used such as, e.g., triangulation methodologies. Triangulation methodologies may include, e.g., proximity to a cell tower, which may be provided by the location platform 55 as is known to those of skill in the art such that further explanation is not required herein to understand the invention. Additionally, in embodiments, the location information can be provided directly from the user 16 using, e.g., A-GPS. By knowing the location of the user 16, it is possible to leverage user location information and history to assign priority associated with delivery notifications. This beneficially allows the wireless service provider to determine higher risk break-ins as well as habitually careless subscribers, who can abuse the solution and impact QoS (Quality of Service) by unduly burdening the core IMS and non-IMS network, which are configured to deliver a real time response to authentication requests.

In embodiments, the load on the location platform 55 may be optimized by routing location information gathered for one or more location services and reusing the information by embedding location as a node in the presence document. In embodiments, this allows load to be minimized on the location platform and throughputs to be increased. Also, the location platform 55 is shown as being connected to the presence server 50 primarily to depict that, in embodiments, location information may be incorporated into a presence document. However, as should be understood by those of ordinary skill in the art, incorporating location information into the presence document may not be necessary, as other mechanisms of exposing and consuming location information are readily available and supported.

The computing device 14 also includes a processor 20, the memory 22A, an I/O interface 24, and a bus 26. The memory 22A can include local memory employed during actual execution of program code, bulk storage, and cache memories which provide temporary storage of at least some program code in order to reduce the number of times code must be retrieved from bulk storage during execution.

The computing device 14 is in further communication with the external I/O device/resource 28 and the storage system 22B. For example, the I/O device 28 can comprise any device that enables an individual to interact with the computing device 14 or any device that enables the computing device 14 to communicate with one or more other computing devices using any type of communications link. The external I/O device/resource 28 may be keyboards, displays, pointing devices, microphones, headsets, etc.

In general, the processor 20 executes computer program code, which is stored in the memory 22A, a read-only memory (ROM) 25, random access memory (RAM) 26, storage 27, and/or storage system 22B. The computer code may be representative of the functionality of the identity SIP A/S 45, the presence server 50, and/or the location platform 55. While executing computer program code, the processor 20 can read and/or write data to/from memory 22A, storage system 22B, and/or I/O interface 24. The program code executes the processes of the invention. The bus 26 provides a communications link between each of the components in the computing device 14.

The computing device 14 can comprise any general purpose computing article of manufacture capable of executing computer program code installed thereon (e.g., a personal computer, server, handheld device, etc.). However, it is understood that the computing device 14 is only representative of various possible equivalent computing devices that may perform the processes described herein. To this extent, in embodiments, the functionality provided by the computing device 14 can be implemented by a computing article of manufacture that includes any combination of general and/or specific purpose hardware and/or computer program code. In each embodiment, the program code and hardware can be created using standard programming and engineering techniques, respectively.

Similarly, the server 12 is only illustrative of various types of computer infrastructures for implementing the invention. For example, in embodiments, the server 12 comprises two or more computing devices (e.g., a server cluster) that communicate over any type of communications link, such as a network, a shared memory, or the like, to perform the processes described herein. Further, while performing the processes described herein, one or more computing devices on the server 12 can communicate with one or more other computing devices external to the server 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

In embodiments, a charging platform 80 is maintained to provide charging models to charge for services rendered. The charging platform 80 may be maintained, deployed, created and/or serviced by the service provider. The charging platform 80 is designed to generate a charging record for services rendered to a subscriber or other user such as, for example, user 16. In embodiments, the service provider can calculate an amount to be charged, based on many different considerations and generate the charging record to be sent to the charging platform 80. In turn, the charging platform 80 can generate an invoice and/or deduct a usage charge from an account of the subscriber.

In embodiments, the invention provides a business method that performs the steps of the invention on a subscription, advertising, and/or fee basis. That is, a service provider, such as a Solution Integrator, could offer to perform the processes described herein. In this case, the service provider can create, maintain, deploy, support, etc., a computer infrastructure that performs the process steps of the invention for one or more customers. In return, the service provider can receive payment from the customer(s) under a subscription and/or fee agreement and/or the service provider can receive payment from the sale of advertising content to one or more third parties.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Exemplary Implementation of the System

Figure 2:
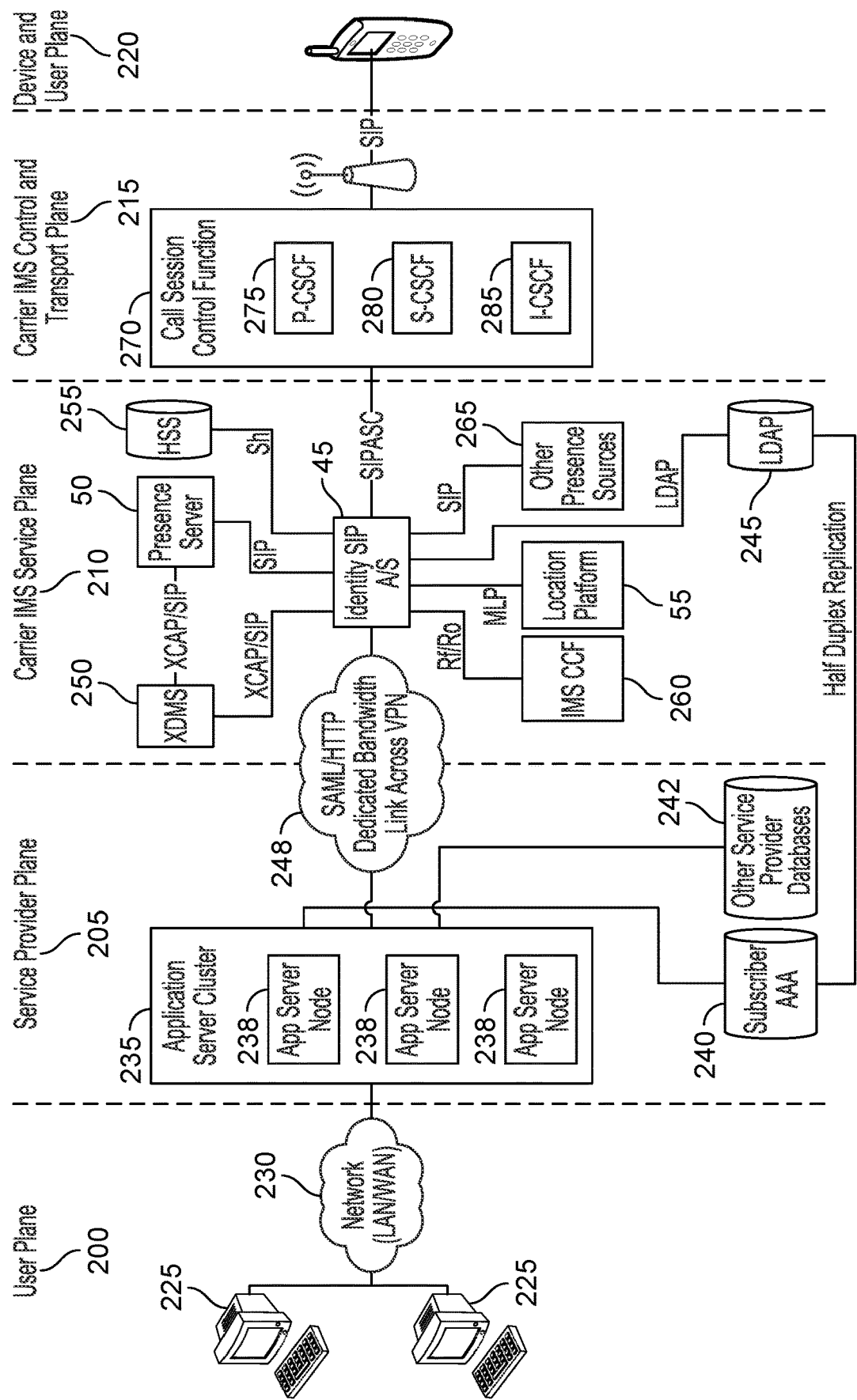
FIG. 2 shows an IMS centric solution federated solution in accordance with aspects of the invention.

FIG. 2 illustrates an IMS centric solution federated solution architecture according to embodiments of the invention. While a federated solution is provided for illustrative purposes, it should be understood that the present invention may allow for multiple identity models, which include fully federated, partially federated, and/or totally un-federated models, i.e., those models wherein the carrier is purely used for delivery. For example, embodiments may cover authentication models that keep in mind a distributed identity model, which may be used in actual deployments.

More specifically, FIG. 2 includes a plurality of layers that comprise a deployment architecture. These layers include a user plane 200, a service provider plane 205, a carrier IMS service plane 210, a carrier IMS control and transport plane 215, and a device and user plane 220. The user plane 200 may include one or more users 225 who have subscribed to one or more services. Exemplary services may include notifications of when a login is attempted, allowing users 225 to disable logins during a predefined period of time, providing a master pin for an extra layer of security, supporting roaming, etc. The users 225 in the user plane 200 may log into a network 230. In embodiments, the network 230 may be a local area network (LAN), a wide area network (WAN), etc.

The network 230 can link together the user plane 200 and the service provider plane 205. The services provider plane 205 may include one or more service providers, e.g., brokerages, enterprises, etc. The services provider plane 205 may also include one or more application servers that are configured to interface with the service providers' backends and are also configured to connect to a telecommunications service provider infrastructure via dedicated bandwidth links.

More specifically, the service provider plane 205 may include an application server cluster 235, which may include one or more application server nodes 238. The application server nodes 238 are configured to verify one or more user credentials, e.g., usernames, passwords, etc., that are sent from the one or more users 225. In embodiments, the process of verifying credentials may include the utilization of one or more databases, such as a subscriber authentication, authorization, audit (AAA) database 240 and/or a service provider database 242, etc. One or more of these databases may be associated with the service provider plane 205.

For example, a user's credentials may be sent to an application server node 238 within the application server cluster 235. The application server node 238 or the application server cluster 235 itself may send the credentials to the subscriber AAA database 240. The AAA database 240 may authenticate the credentials and provide authorization or privileges to the user 225 based on the authentication, the types of privileges requested, and/or the state of the system. An audit may be used to track the requested privileges and/or the consumption of network resources consumed by the user 225. In embodiments, the audit may also be used for billing purposes in accordance with one or more service provider agreements. In embodiments, the billing model may leverage the trusted relationship between the carrier and the subscriber for purposes of charging rating and mediation models to support all kinds of billing flexibility. The information in the subscriber AAA database 240 may be synchronized with an LDAP 245, e.g., using a half duplex replication.

Service provider databases 242 may be used in addition to or instead of the subscriber AAA database 240. In embodiments, the service provider database 242 may include information about one or more service providers that the user 225 is accessing. The service provider database 242 may also include information on what types of privileges the user 225 has and/or what types of services are being provided to the user 225 under existing agreements between the user 225 and the service provider. In embodiments, information in the service provider databases 242 may be specific to a single service provider or may be applicable to more than one service provider. Moreover, in embodiments, the information in the service provider database 242 may be used by the subscriber AAA database 240.

After a user's 225 credentials are verified, the user 225 may obtain access to the carrier service plane 210, the carrier IMS control and transport plane 215, as well as the IMS infrastructure interfaces via ISC/SIP to the device plane 220. For example, in embodiments, the user may obtain access to one or more of these planes via, e.g., a dedicated bandwidth link across a virtual private network. The dedicated bandwidth link may use a security assertion markup language (SAML) and/or a hypertext transport protocol 248. The carrier IMS service plane 210 may include one or more carriers, which the user 225 may opt into individually or as a group. The user 225 may also decide which services to receive from each carrier. For example, a user may receive stricter security services for carriers handling sensitive information and a less strict security for carriers that do not handle sensitive information.

The carrier IMS service plane 210 may include a plurality of pertinent nodes. For example, the carrier IMS service plane 210 may include the identity SIP A/S 45, an XDMS 250, a presence server 50, a home subscriber server (HSS) 255, an IMS charge collection facility 260 (e.g., charging platform 80 of FIG. 1), the location platform 55, a LDAP 245, and other presence sources 265. The identity SIP A/S 45 is configured to act as an SAML bridge that allows a SIP enabled device to attach to a telecommunications service provider network for the intent of participating in authentication flows in an online and offline manner. By allowing the identity SIP A/S 45 to act as a SAML bridge, the user 225 can be notified of authorization requests, such as login attempts, and can thus prevent unauthorized attempts to access the user's online credentials. The identity SIP A/S 45 may communicate with a XDMS 250 using a SIP or an XML configuration access protocol (XCAP). The XDMS 250 may be configured as any model known to those of skill in the art for managing and/or storing XML or non-XML data.

The presence server 50 may communicate with the XDMS 250 using XCAP and/or SIP. Moreover, the presence server 50 may communicate with the identity SIP A/S 45 using SIP. The presence server 50 is configured to accept, store and distribute presence information. For example, the presence server 50 may be used to determine a user's presence (e.g., presence state), which constitutes the user's personal availability. In embodiments, the presence server 50 may be implemented as a single server or have an internal structure involving multiple servers and proxies. There may be complex patterns of redirection and proxying while retaining logical connectivity to a single presence service. The presence server 50 may be used, in combination with the SIP A/S 45 using SIP for authenticating users.

The HSS 255 is configured to communicate with the identity SIP A/S 45 using SH. The HSS 255 may include one or more databases configured to support IMS network entities and handle calls. In embodiments, the HSS 255 includes information about the user, such as a user profile, and may also provide information on a user's physical location. This information may also be used to authenticate a user. For example, knowing the location of the user it is possible to determine whether the user is physically at the same location of a device which is attempting to obtain the user's credentials.

The IMS CCF 260, or charging platform, communicates with the identity SIP A/S 45 using Rf and Ro. While Rf and Ro are used for illustrative purposes, it should be understood that embodiments may support multiple charging models over an IMS network using diameter based Rf and Ro sub-protocols as well as support for non-IMS networks. The IMS CCF 260 is configured to generate a charging record for services rendered to a user 225.

The location platform 55 is configured to provide the location of a user 225. In embodiments, the location platform 55 may use meridian lossless packing (MLP) to communicate with the identity SIP A/S 45. The identity SIP A/S 45 may be associated with the LDAP 245, whereby user information, carrier information, etc., is sent to the LDAP and synchronized with the subscriber AAA database 240. Additionally, the identity SIP A/S 45 may also be connected to other presence sources 265 using SIP. The location information may also be used to authenticate a user as discussed above.

The identity SIP A/S 45 may be used to connect the carrier IMS service plane 210 to the carrier IMS control and transport plane 215 using SIP and/or inter-systems communication (IMS). In embodiments, the identity SIP A/S 45 may be directly or indirectly connected to a call session control function 270 within the carrier IMS control and transport plane 215. The call session control function 270 may include a proxy CSCF (P-CSCF) 275, which is a SIP proxy configured to act as the first point of contact for the IMS terminal. In embodiments, the P-CSCF 275 may authenticate users and prevent spoofing and/or replay attacks. Additionally, the P-CSCF 275 may decompress incoming messages to reduce the amount of time to send messages over radio links.

The call session control function 270 may also include a serving CSCF (S-CSCR) 280. In embodiments, the S-CSCR 280 is configured to route SIP based interactions to the right application servers based on the service type after initial filter criteria (IFC) has occurred. Thus, the S-CSCR 280 may act as a central node to obtain user profiles from the HSS 255 via the identity SIP A/S 45. The call session control function 270 may further include an interrogating CSCF (I-CSCF) 285, which may be used to obtain the user's location and route one or more SIP requests to the S-CSCF 280. Upon passing through the carrier IMS control and transport plane 215, the message may continue to the device and user plane 220.

Figure 3:
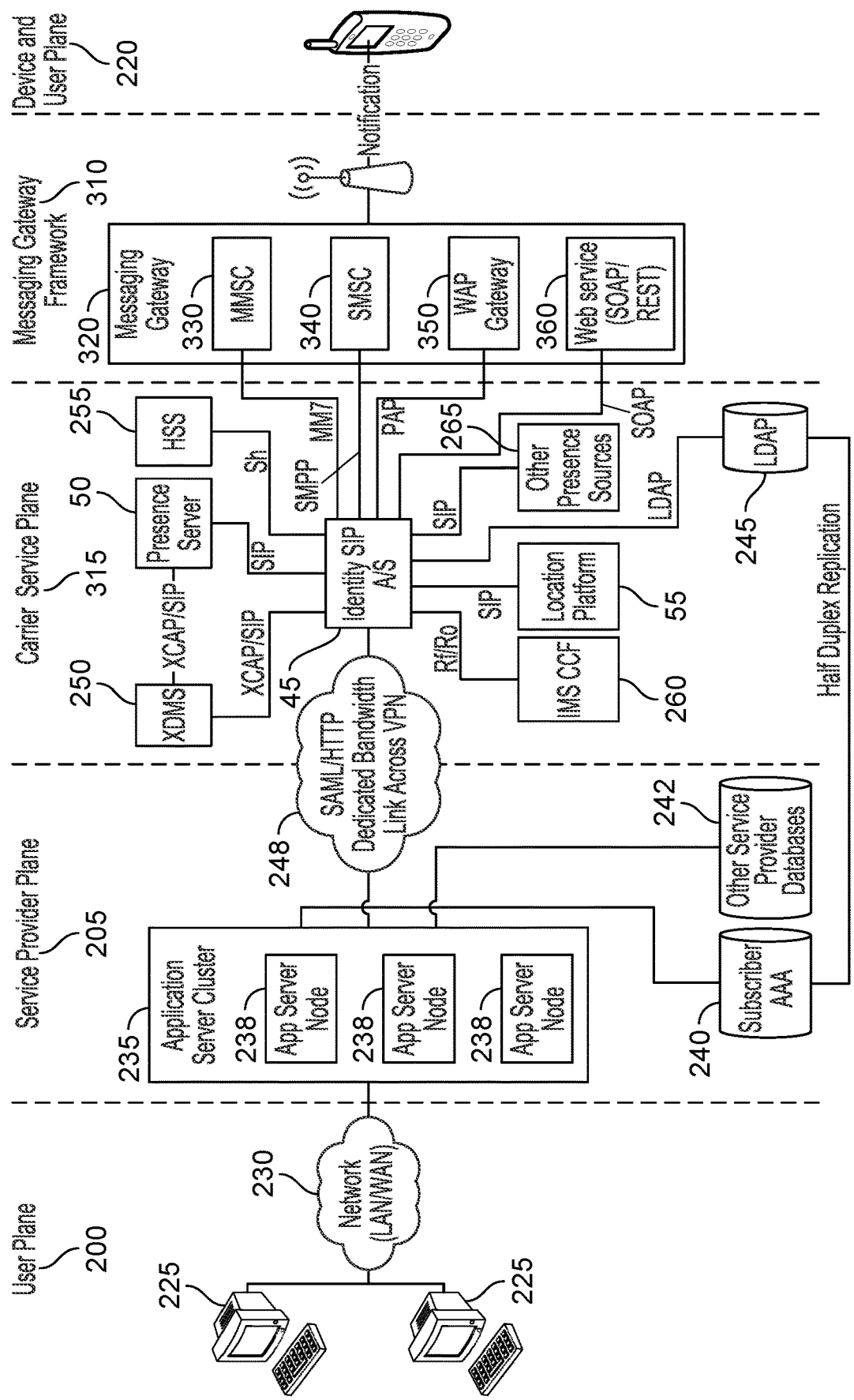
FIG. 3 shows a non-IMS centric solution configured to support non-IMS devices in accordance with aspects of the invention.

FIG. 3 illustrates a non-IMS centric solution architecture configured to support non-IMS devices according to embodiments of the invention. FIG. 3 is similar to FIG. 2 in many ways. Similar features between FIGS. 2 and 3 are represented with the same reference numeral. The main difference between FIGS. 2 and 3 is the delivery mechanism, which is a messaging gateway framework 310 configured to route a delivery using a subscriber profile and a location platform. Another difference is the use of a carrier service plane 315 instead of a carrier IMS service plane 210. Within the carrier service plane 315, embodiments may employ one or more communication methods that may be the same or different than those employed in FIG. 2. For example, the identity SIP A/S 45 may communicate with the location platform 55 using SIP.

The messaging gateway framework 310 comprises a messaging gateway 320. In embodiments, the messaging gateway 320 may include a multimedia message service center (MMSC) 330, a short message service center (SMSC) 340, a wireless application protocol (WAP) gateway 350, and a webservice 360 such as a simple object access protocol (SOAP) and/or a representational state transfer (REST).

As should be understood by those of skill in the art, the MMSC 330 is configured to deliver messages to a user by encoding multimedia content and inserting the encoded multimedia content into a text message. The SMSC 340 is configured to allow short text messages to be exchanged between mobile devices. The WAP 350 may be used to enable access to the Internet from a mobile device. The webservice 360 may include a SOAP protocol specification for exchanging information over the webservice 360 and/or may include a REST to collect architecture principles about how resources are defined and addressed on the network. By utilizing the messaging gateway framework 310, the present invention can be used to support non-IMS devices.

Exemplary Processes

The flowchart and block diagrams in the Figures illustrate the architecture, functionality, and operation of possible implementations of systems, methods and computer program products according to various embodiments of the present invention. In this regard, each block in the flowchart or swim lane or block diagram may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood that each block of the flowchart or swim lane illustrations and/or block diagrams, and combinations of blocks in the flowchart or swim lane illustrations and/or block diagrams, can be implemented by computer program instructions as described in the environment of FIG. 1. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks. The processes described herein can thus be implemented in the environment of FIG. 1 and/or the architectures of FIGS. 2 and 3.

Figure 4:
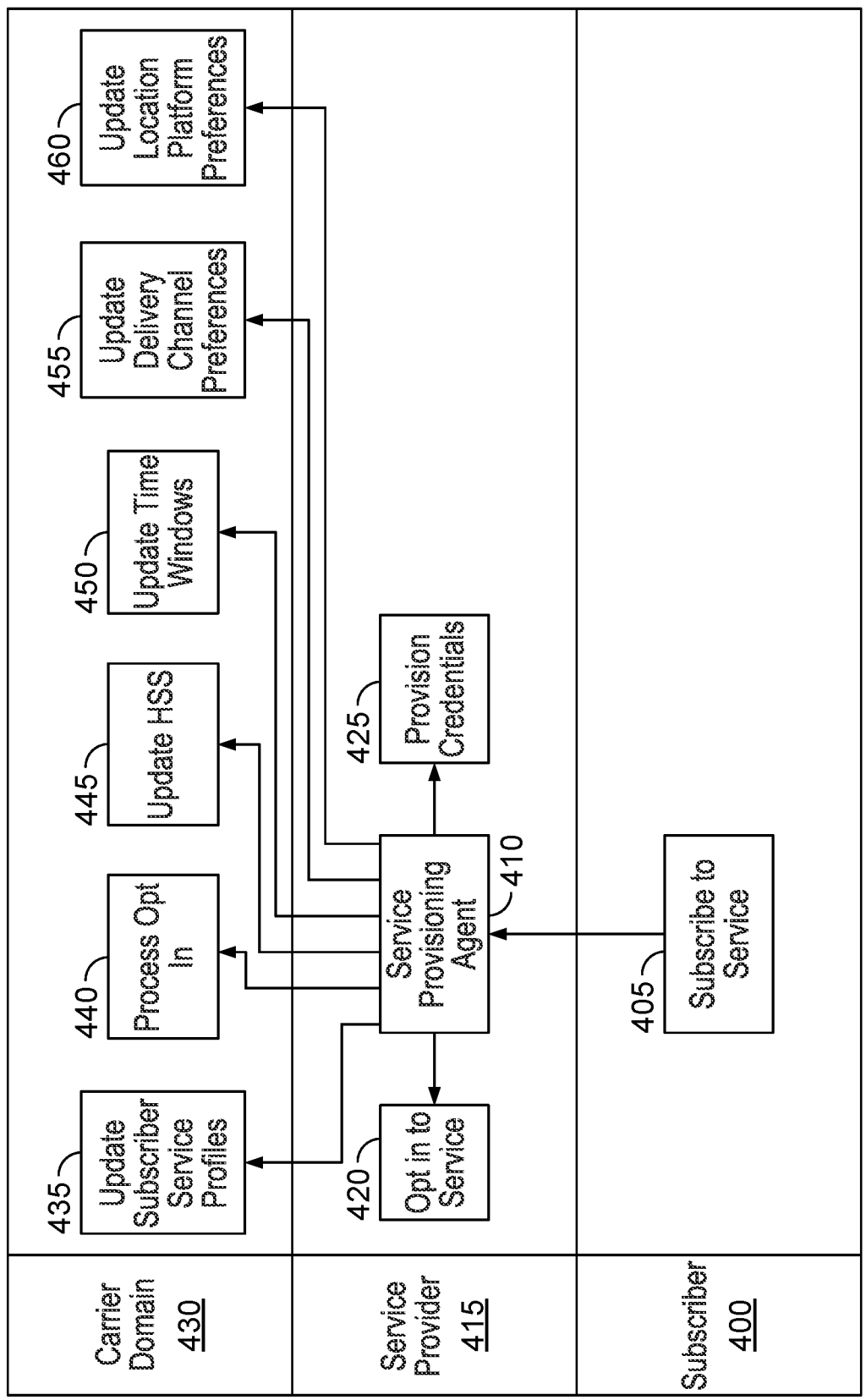
FIG. 4 shows a subscriber provisioning flow in accordance with aspects of the invention.

FIG. 4 shows a subscriber provisioning flow in accordance with embodiments of the invention. The flow includes the following roles: subscriber 400, service provider 415, and carrier domain 430. At step 405, a subscriber decides to subscribe to a service. In doing so, at step 410, the subscriber registers for the service with a provisioning proxy, such as a service provisioning agent (SPA), which may be provided by a service provider. In embodiments, the SPA may handle distributed updates within the infrastructure. The SPA may also allow for a single point of control and handle protocol conversions to all the elements involved within and outside the service provider and the telecommunications service provider domains.

At step 420, the SPA obtains a request for service from the subscriber. Once received, the SPA determines whether the subscriber can opt into one or more services offered by the service provider. Exemplary services may include, e.g., receiving a text message each time a login attempt is made, requiring an authorization code prior to processing the login attempt, etc.

For example, a subscriber may be provided with a service wherein the subscriber may disable logins to anything during a predefined period of time, e.g., during a blackout period. This allows the subscriber to blackout periods of time that the subscriber may have his or her device turned off, such as when the subscriber is asleep. Any login attempts during the blackout periods can be automatically rejected. Thus, a subscriber need not worry about missing a notification request and an unauthorized login being successful during the blackout periods.

Similarly, a subscriber may be provided with a timeout service. In embodiments, this service may allow a subscriber to specify a maximum period of time for an authentication process to actually result in the authentication going through successfully. If the period of time to be successfully processed by a client exceeds the timeout, the request can be denied.

In yet another example, a service may be provided that allows the subscriber to authenticate the login attempt using, e.g., a mobile device. During this authentication process, the SIP client on the device may ask the subscriber to enter a master pin to validate the subscriber as himself or herself. This beneficially allows an extra layer of security to prevent the rare situation where both the device and a set of credentials have been compromised.

A subscriber may also be provided with a subscription confirmation service. This service may be used, e.g., when a subscriber signs up for an online service and receives an email having a link that the subscriber must use to complete the subscription process. The link may include an embedded hash that allows the subscriber to obtain access to his or her account by selecting the link. Once selected, a notification may be sent to the subscriber's device for authentication. In embodiments, the subscriber may authenticate the subscription attempt before the subscription process can be completed.

In embodiments, a service may be provided to support roaming. This may be handled, e.g., using a cross carrier federation, wherein the carrier federation may leverage this service using IMS and non-IMS roaming semantics when the subscriber is out of his or her home network.

The use of a base credential set may be provided as a service to subscribers. This service takes into account that subscribers may not want the carriers to have too much personal information. Thus, a base set of credentials is provided to the carrier rather than all of the subscriber's personal information. For example, to avoid credentials from being compromised, embodiments may provide only the user identification and password to the carrier. In embodiments, it is possible to use more or fewer credentials depending on the type of information being sent. For example, embodiments may be implemented for authentication requests when a trusted card without two factor authentication is used, such as a credit card authorization.

At step 425, the SPA accesses one or more provision credentials, which may relate to the subscriber. At step 430, the SPA utilizes a number of features associated with the carrier domain. For example, at step 425, the SPA may update subscriber service profiles, such as a master profile in the telecommunications service provider (TSP). This may be akin to an LDAP update in a non-IMS environment.

At step 430, the SPA may utilize a process opt in feature, which is configured to update the authorization for the subscriber for each of the service providers. As explained herein, the service provider may include, e.g., a bank, a brokerage, an enterprise, etc. Thus, for example, a rule can be added for a particular brokerage for a particular subset of systems when an single sign on (SSO) is not available for that service provider.

At step 435, the HSS is updated to be included in the carrier domain. For example, the HSS update may be performed in a pure IMS network. This may include a call flow operation wherein the HSS updates can be operationalized and made available in an LDAP for high speed massive scalable lookups.

At step 455, window preferences may be updated in the carrier domain. In particular, at step 455, blackout times for specific service providers and service combinations can be specified as part of the update time windows feature. In embodiments, authentication requests received during one or more blackout times may be automatically denied.

Also included in the carrier domain may be a feature to update delivery channel preferences, at step 455. This feature may be used to update delivery channels that may be pertinent to the subscriber. For example, at step 455, in a non-IMS context, the update delivery channel preferences may be used for one way delivery of a notification via an SMS delivery channel. However, embodiments may employ any number of alternative delivery channels, especially in a non-IMS context.

At step 460, an update location platform preferences feature may be included in embodiments of the invention. This feature may be used to update one or more location platform preferences, which may be stored separately in one or more networks. The feature may also update one or more location platform preference that are aggregated centrally as part of one of the earlier steps.

Figure 5:
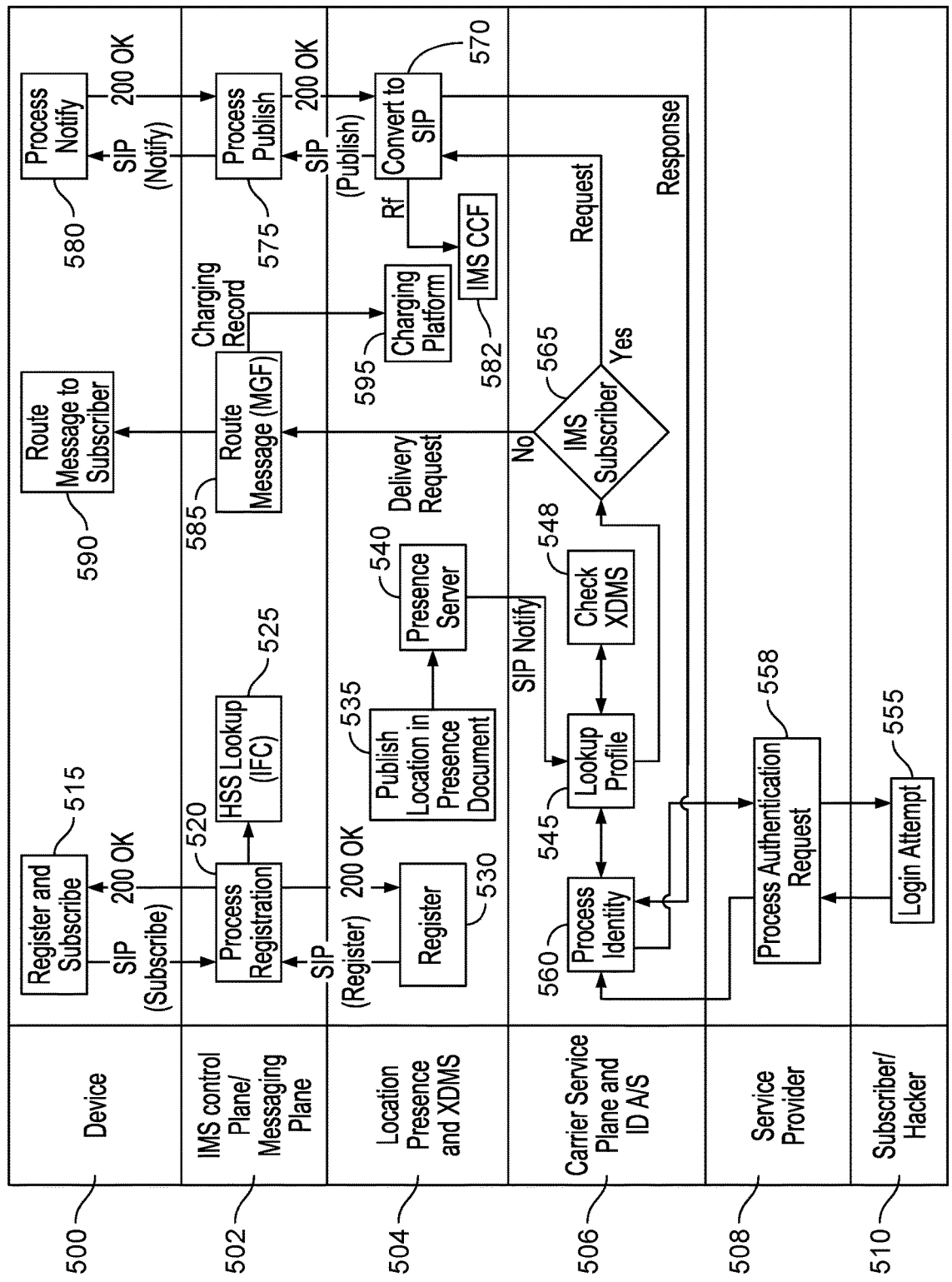
FIG. 5 shows a runtime call flow associated with a submission in accordance with aspects of the invention.

FIG. 5 illustrates a runtime call flow associated with the functioning of a submission in accordance with embodiments of the invention. FIG. 5 shows six roles: device 500, IMS control plane/messaging plane 502, location presence and XDMS 504, carrier service plane and identity SIP A/S 506, service provider 508, and subscriber/hacker. At step 515, a user registers and subscribes to a service with a device. In embodiments, this may be performed by using standard SIP semantics to register for the service as part of the standard IMS sequence. For example, a device can send a SIP subscribe message to the IMS control plane/messaging plane. At step 520, the message is received and the registration processed.

The registration process may entail using a HSS lookup, at step 525. The HSS lookup may use an initial filter criteria (IFC) to determine whether the device is actually authorized to use the service. If the device is authorized, at step 530, the subscriber can register with the SIP register (S-CSCF via the P-CSCF and I-CSCF) using SIP semantics and a 200 OK message can be sent to the subscriber. If the subscriber is not authorized, the subscriber is not registered with the SIP register.

At step 535, information about the location of the device can be published in a presence document. In embodiments, this may be performed in conjunction with the steps described above. At step 540, the presence server may be updated with location information via a SIP connector and may include one or more presence documents that may be associated with the subscriber. Thus, in embodiments, the location information may be used to determine whether the device is located at or near the location of an attempted login. If the device is in a different location, it may be more likely that the attempted login is fraudulent.

Location information may be used in a variety of ways to promote efficiency and usability. For example, for practicality purposes, embodiments may not try to verify the location that a transaction is taking place; rather, the location integration may use a SIP based location publish mechanism, such as in step 575, that allows subscribers in the network to obtain location information derived for other purposes from a cache in the presence document. Moreover, in embodiments, location information in the presence document may also be used to efficiently disseminate presence information via SIP to registered subscribers, i.e., network elements of an A/S in an IMS network.

In another example, a wireless carrier infrastructure may maintain a risk rating associated with a particular login attempt. This risk rating may be determined by factoring in the actual physical location of the subscriber and assigning a modified risk associated with the particular attempt. For example, an attempt made while the subscriber is in a set of predefined locations such as, e.g., a frequented geoboundary, may be less likely to be from an unauthorized user than an attempt made from a non predefined location. Accordingly, the relative priority of delivering asynchronous notifications may be higher when the notification attempt is sent when the subscriber is not in one of these predefined locations than when the subscriber is within one of these predefined locations. For example, a subscriber attempting to login from work, home, on a certain geographical route, etc., may have a relative lower priority than a subscriber making multiple attempts to login from a mall. In embodiments, the subscriber attempting to login from the mall may be flagged for a higher priority treatment.

By utilizing a presence server, anyone (including the identity SIP A/S) that is subscribed to the user's presence as a result of his or her subscription to the service is notified when the location platform connector publishes changes. In embodiments, this may be performed by sending a SIP notify message to the carrier lookup profile, at step 454. The carrier lookup profile may include information on what device is being used. At step 548, the lookup profile checks with an XDMS, which is configured to store a list of locations or sites that are in the solution set associated with the subscriber. In embodiments, the XDMS may be SIP enabled allowing for list changes to be communicated to subscribers if necessary. By using a XCAP based interface, changes can be made to one or more lists in the lookup profile using the interface provided by the service provider infrastructure.

At step 555, a subscriber (or a hacker with malicious intent) may make a login attempt to one of the sites in the solution set within the XDMS. At step 558, the login request may be sent to a service provider as a SAML request, wherein the authentication request, i.e., the login, is processed. The authentication process may include processing the subscriber's identity, at step 560. During authentication, an SMS or other notification message may be sent asynchronously via a messaging gateway framework (MGF) to the subscriber. This allows the service provider to provide a service to the subscriber or hacker without notifying the actual subscriber.

At step 560, the subscriber's request may be authenticated and the subscriber's identity processed. In processing the subscriber's identity, the identity SIP A/S may perform a profile lookup, as described in step 545, to determine whether the request falls in a blackout time that may cause the login to be immediately rejected. A notification may be sent to the subscriber regarding the attempted login. In embodiments, the notification may be an offline asynchronous notification.

At step 565, the identity SIP A/S may use the lookup profile to determine whether the subscriber is an IMS or non-IMS subscriber. If the subscriber is an IMS subscriber, the identity SIP A/S sends a notification to the subscriber's SIP enabled device. This may be performed by converting the request to SIP, at step 570, and sending a SIP publish request, at step 575. At step 580, the publish request is processed and sent to the device as part of a notification process. At this point, the subscriber may get a SIP notification and the SIP client may allow the subscriber to enter an additional secret code to allow the login to continue. The SIP notification and the SIP 200 OK message may be leveraged by the SIP A/S to get a response from the device. Optionally, the response may be sent back to the service provider authentication plug-in via the identity SIP A/S. Once a secret code is entered and/or a response is sent back to the service provider, a charging record may be sent to the IMS CCF, at step 582.

If the subscriber is a non-IMS subscriber, at step 585, a raw notification or delivery request may be sent to a message router (e.g., messaging gateway framework or MGF) configured to pick the best delivery channel to inform the subscriber based on the subscribers profile information. At step 590, this delivery channel may be used to route a message to the subscriber. As this is a non-IMS subscriber, and asynchronous notification may require the subscriber to take an offline action. In embodiments, a charging record may be sent to a charging platform, at step 595.

In embodiments, the service provider may not have federated all identity to the wireless carrier and may have instead chosen to use it's own identity model. Under this scenario, a subscriber can still be part of the call flow. When a login is initiated on the subscriber's behalf, the application server in the brokerage infrastructure may validate the credential set and send a SAML request to the subscriber. In embodiments, the SAML request may be converted to a SIP request before being sent to the subscriber. Once received, the subscriber can recognize the unauthorized login attempt and reject it, thereby causing the login to be denied and the subscriber to change his or her credentials as a result of the unauthorized login attempt.

Similarly, a service provider can decide to maintain its identity infrastructure. The service provider may also decide to use a carrier notification service to asynchronously notify the subscriber when an attempt is made, successful or otherwise. Thus, the subscriber can take an appropriate action when the subscriber is notified of what may be an unauthorized login attempt.

In addition to handling multiple security models, it should be understood that the present invention is also configured to handle SAML and non SAML based interactions for authentication between the between a service provider and a carrier or identity provider, such as a wireless telecommunications provider. Embodiments may also leverage SIP and other technologies as a communications mechanism between the wireless telecommunications provider and the real subscriber.

As can be understood by at least FIGS. 1-5, the present invention leverages SIP and XCAP integration to a presence server and XDMS implementation, along with a location platform to bring subscribers into a trust shield that provides the online ability to block authentication requests that the subscriber has not made. Moreover, embodiments all allow a less invasive notification infrastructure across both IMS and non-IMS networks. This beneficially supports near real time notification of attempts, which allows offline action to be initiated by a compromised subscriber.

Exemplary Embodiments

The following examples have been provided for purposes of illustration and should not be construed as limiting the present invention. In a first example, subscriber A has subscribed to a wireless service provider's theft blocking service within a core network. Subscriber A has also asked his or her service provider(s) to use a carrier as the identity provider via an opt-in scheme. Subscriber A also has an IMS compliant device, such as a phone, which is capable of handling SIP based signaling. In this example, subscriber A's home PC is infected with malware, such as a key stroke logger, which conditionally sends subscriber A's credentials to a remote location based on the site to which he or she navigates. When a hacker, who has obtained one or more of these credentials, tries to log into subscriber A's account, the site sends a SAML request to an identity provider, e.g., a wireless carrier. The type of account used can include, e.g., a bank, a brokerage, an enterprise, etc. In embodiments, the site may be a service provider or the like.

The identity provider is configured to use a central subscriber profile (HSS) to authenticate the subscriber and send a SIP request to subscriber A on a mobile phone, which is turned on, as part of the authentication call flow. Subscriber A may receive the SIP request and recognize a problem if the user is not in fact trying to log into the site. The subscriber A may subsequently reject the authentication request, which may result in a wireless carrier sending a negative SAML response back to the brokerage application server and the login to be rejected. Based on the unauthorized login, subscriber A may change his or her credential set, thereby making the old credential set invalid. In embodiments, the decision to change a credential set may be mandatory or discretionary.

In another example, subscriber B has a non-IMS compliant telephone and is registered with a wireless service provider. Subscriber B has also federated his or her identity by asking the wireless provider to be the identity provider and his or her brokerage to be a service provider. In this example, subscriber B's credentials have been compromised. When a hacker attempts to use subscriber B's credentials to login, the brokerage application server sends a SAML request to the identity provider. The identity provider can then use a notification engine such as the MGF to inform subscriber B of the event. In the case, e.g., that a SMS delivery channel was chosen within the MGF (messaging gateway framework), the request can be successfully fulfilled and the hacker may obtain access to the site. However, at the same time, subscriber B may be notified of the request via, e.g., SMS and can immediately react to the notification by notifying the brokerage house and changing his or her credential set.

In a further example, subscriber C may have an IMS compliant device and may also have reduced his or her service setting to a base notification mode. In embodiments, a base notification mode may be used to notify subscriber C in near real time when someone attempts to login into one of subscriber C's less trusted accounts. A less trusted account may include any account that the user has chosen to apply a lower security level to such as, e.g., a lower value email account. In embodiments, standard SIP semantics (e.g., an SIP Notify followed by a 200 OK) may be used to notify subscriber C about the initiated login. If the login is a routine event, it can be ignored by subscriber C.

While the invention has been described in terms of embodiments, those skilled in the art will recognize that the invention can be practiced with modifications and in the spirit and scope of the appended claims. Additionally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims, if applicable, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated. Accordingly, while the invention has been described in terms of embodiments, those of skill in the art will recognize that the invention can be practiced with modifications and in the spirit and scope of the appended claims.

What is claimed is:

1. A computer program product for preventing identity theft, the computer program product being embodied in a non-transitory computer readable storage medium and comprising computer instructions for:
receiving one or more credentials via a login attempt by a first device;
processing the one or more credentials to identify a subscriber having the one or more credentials;
providing a plurality of services to the subscriber, comprising:
sending a notification to a second device associated with the subscriber to notify the subscriber of the login attempt, comprising:
generating a risk rating associated with the login attempt, wherein the risk rating is a likelihood that the login attempt is fraudulent, wherein generating the risk rating comprises:
determining a device location of the first device based on information about the location of the first device published in a presence document;
determining a subscriber location based on information on the subscriber's physical location in a user profile;
determining whether the device location and the subscriber location is a same location; and
in response to a determination that the device location and the subscriber location is not the same location:
assigning a higher risk rating to the risk rating; and
sending the notification to the second device, wherein a priority for delivery of the notification to the second device is based at least in part on the risk rating, wherein the sending of the notification to the second device comprises:
determining whether the subscriber is an Internet protocol (IP) multimedia subsystem (IMS) subscriber or a non-IMS subscriber; and
in response to a determination that the subscriber is the IMS subscriber:
converting the notification to an identity session initiation protocol (SIP) publish request; and
sending the SIP publish request to the second device.

2. The computer program product of claim 1, further comprising receiving from the subscriber confirmation that the login attempt is of the subscriber.

3. The computer program product of claim 1, wherein at least one of the receiving, the processing, and the sending are implemented based on authentication requests when a trusted card without two-factor authentication is used.

4. The computer program product of claim 1, wherein at least one of the receiving, the processing, and the sending are implemented in association with credit card authorization.

5. The computer program product of claim 1, wherein the plurality of services further includes a timeout service which allows the subscriber to specify a maximum period of time for a successful authentication.

6. The computer program product of claim 1, wherein the plurality of services further includes requiring an authorization code prior to processing the login attempt.

7. The computer program product of claim 6, wherein the authorization code is a master pin.

8. The computer program product of claim 1, wherein the plurality of services further includes a blackout period which allows the subscriber to disable the login attempt during a blackout period of time.

9. The computer program product of claim 8, further comprising automatically rejecting the login attempt in response to the login attempt being received during the blackout period of time.

10. The computer program product of claim 1, wherein the notification is from an IMS control plane.

11. The computer program product of claim 1, further comprising denying the login attempt in response to the subscriber indicating to deny the login attempt.

12. The computer program product of claim 1, further comprising receiving from the subscriber one of an indication to accept the login attempt and an indication to reject the login attempt.

13. The computer program product of claim 1, wherein the plurality of services is associated with a carrier.

14. A method for preventing identity theft, comprising:
receiving one or more credentials via a login attempt by a first device;
processing the one or more credentials to identify a subscriber having the one or more credentials;
providing a plurality of services to the subscriber, comprising:
sending a notification to a second device associated with the subscriber to notify the subscriber of the login attempt, comprising:
generating a risk rating associated with the login attempt, wherein the risk rating is a likelihood that the login attempt is fraudulent, wherein generating the risk rating comprises:
determining a device location of the first device based on information about the location of the first device published in a presence document;
determining a subscriber location based on information on the subscriber's physical location in a user profile;
determining whether the device location and the subscriber location is a same location; and
in response to a determination that the device location and the subscriber location is not the same location:
assigning a higher risk rating to the risk rating; and
sending the notification to the second device, wherein a priority for delivery of the notification to the second device is based at least in part on the risk rating, wherein the sending of the notification to the second device comprises:
determining whether the subscriber is an IMS subscriber or a non-IMS subscriber; and
in response to a determination that the subscriber is the IMS subscriber:
converting the notification to an SIP publish request; and
sending the SIP publish request to the second device.

15. The method of claim 14, wherein the notification is from an IMS control plane.

16. The method of claim 14, further comprising receiving confirmation from the subscriber that the login attempt is by the subscriber.

17. The method of claim 14, further comprising denying the login attempt in response to the subscriber indicating to deny the login attempt.

18. The method of claim 14, wherein at least one of the receiving, the processing, and the sending are implemented for authentication requests when a trusted card without two factor authentication is used.

19. The method of claim 14, wherein at least one of the receiving, the processing, and the sending are implemented for credit card authorization.

20. The method of claim 14, wherein the plurality of services further includes requiring an authorization code prior to processing the login attempt.

21. The method of claim 20, wherein the authorization code is a master pin.

22. The method of claim 14, wherein the plurality of services further includes a blackout period which allows the subscriber to disable the login attempt during a blackout period of time.

23. The method of claim 22, further comprising automatically rejecting the login attempt in response to the login attempt being received during the blackout period of time.

24. The method of claim 14, wherein the plurality of services further includes a timeout service which allows the subscriber to specify a maximum period of time for a successful authentication.

* * * * *

UNITED STATES PATENT AND TRADEMARK OFFICE
CERTIFICATE OF CORRECTION

PATENT NO. : 11,595,816 B2
APPLICATION NO. : 15/138315
DATED : February 28, 2023
INVENTOR(S) : Mamdouh Ibrahim et al.

It is certified that error appears in the above-identified patent and that said Letters Patent is hereby corrected as shown below:

On the Title Page

Item (71), applicant, address, delete "MI (US)" and insert --CA (US)--, therefor.

In page 2, Column 2, item (56), U.S. patent documents, Line 13, delete "Dberle et al." and insert --Oberle et al.--, therefor.

Signed and Sealed this
Twenty-fourth Day of October, 2023

Katherine Kelly Vidal
*Director of the United States Patent and Trademark Office*